United States Patent Office 2,825,709
Patented Mar. 4, 1958

2,825,709

METHOD OF MAKING COATING COMPOSITION CONTAINING POLYETHYLENE AND POLYISOBUTYLENE

Robert Heinrich Sturm, Enfield, England, assignor to Cosmocord Plastics Limited, Enfield, England, a British company No Drawing. Application April 6, 1951
Serial No. 219,756

Claims priority, application Great Britain April 14, 1950

23 Claims. (Cl. 260—28.5)

This invention relates to coating compositions containing polyethylene.

Polyethylene being a paraffin of crystalline structure dissolves in non-polar solvents only at temperatures above 60° C. The high degree of crystallisation of polyethylene results in a progressive process of dissolving with increasing temperature, so that although part of the crystals will start to swell and melt at approximately 50° C. the last crystals will only dissolve on reaching a temperature of about 120° C.

Such polyethylene solutions may be used as coating compositions by applying them as a hot solution to the surfaces to be coated, the surfaces being preferably warmed. To achieve a continuous phase film the application of heat to the coated surface is recommended in order to fuse the crystals.

From time to time it is desired to apply a coating containing polyethylene to a material or surface which is not capable of withstanding the temperatures involved in applying the existing coating compositions referred to above.

It is one object of the invention, therefore, to provide a coating composition containing polyethylene which can be applied without the use of such high temperatures as are required by the existing compositions and can even be applied without heat.

The present invention consists of a coating composition comprising polyethylene in which the mean size of the particles of polyethylene is not greater than 0.6 micron, the particles being reduced by grinding the polyethylene in a volatile liquid which is a true solvent for the polyethylene.

The invention also includes a coating composition comprising a solution containing polyethylene compounded with polyisobutylene, the proportion of polyisobutylene being such as to give an increased water vapour impermeability to the resulting coatings, the compound particles having a mean size not greater than 0.6 micron.

The present invention will be better understood from the following examples of typical coating compositions and their method of manufacture.

It has already been stated that in a composition in accordance with the invention polyethylene particles are reduced to an ultra-microscopic size by grinding in true solvents. Such grinding may be performed, with or without diluents, in a heated ball mill, which may be heated, for example, to a temperature of between 60° and 80° C. After the polyethylene has dissolved the heat is gradually reduced to room temperature and the grinding continued until the mean size of the particles in the dispersion is, for example, 0.4 to 0.6 micron in diameter.

The method of dissolving polyethylene in a heated ball mill is only one of many ways of preparing a colloidal dispersion of microcrystalline particles and although it has been found to be a simple method of dissolution and reduction, many other methods of achieving the same result will be apparent to those skilled in the art.

The true solvents used may be, for instance, aromatic hydrocarbons such as for example benzene, xylol, toluol, or chlorinated hydrocarbons such as for example, methyl chloroform, carbon tetrachloride, tetrachloroethane, monochlorobenzene, monochlorotoluol, or ketones such as for example cyclohexanone, methylcyclohexanone, isophorone. These can be used alone or in a mixture of two or more solvents of the above mentioned groups.

To control the evaporation rate of the liquid phase and to suit particular methods of application it may be advantageous to add to the true solvents diluents like aliphatic hydrocarbons as for instance aliphatic petroleum naphthas, ligroin, petroleum spirits, kerosene, or esters such as for instance ethyl-, propyl- or butyl-acetates, ethyl lactate, or ethers such as ethylene glycol mono- ethyl or butyl ethers, diethylene oxide, or ketones such as for instance acetone, methyl ethyl ketone, methyl isobutyl ketone, di-isobutyl ketone, diacetone alcohol, or alcohols as for instance ethyl-alcohol, isopropyl-alcohol, butyl-alcohol, cyclohexanol.

A polyethylene coating composition incorporating a plasticiser, such as a chlorinated diphenyl, to improve the adhesion may have a composition as follows:

Example I

|  | Parts by weight |
|---|---|
| Polyethylene | 11 |
| Chlorinated diphenyl, sp. g. 1.620 | 3 |
| Monochlorobenzene | 34 |
| Xylol | 12 |
| Cyclohexanone | 8 |
| Methyl isobutyl ketone | 15 |
| Isopropyl alcohol | 17 |
|  | 100 |

The polyethylene together with the chlorinated diphenyl are heated with the true solvent mixture of monochlorobenzene, xylol and cyclohexanone in a jacketed mixer provided with a stirrer to between 60° and 70° C. After dissolution the diluents methyl isobutyl ketone and isopropyl alcohol are stirred into the solution and the blend transferred to a ball mill. The blend is milled for about 72 to 96 hours at room temperature until the particle size is between 0.4 to 0.6 micron. The resulting coating composition is a stable colloidal dispersion which can be applied without heat.

The water vapour impermeability of the final coating may be substantially increased and the coating given an improved adhesion by compounding polyisobutylene with the polyethylene. Furthermore it is possible by such compounding to produce solutions with a higher solid content. It has been found by experiment that a compound of 70% to 80% of polyethylene and 30% to 20% of polyisobutylene of a molecular weight of 85,000 to 95,000 gives the best results.

This is borne out by the following table which shows the water vapour permeability of films of 0.004 inch thickness for compounds prepared in accordance with the present invention and containing various proportions of polyisobutylene of a molecular weight of 95,000:

|  | Percent of polyisobutylene | Water vapour uptake, grams/sq. Metre in 24 hours |
|---|---|---|
| (a) | 0 | 29.670 |
| (b) | 20 | 4.566 |
| (c) | 30 | 4.261 |
| (d) | 50 | 7.610 |

The polyisobutylene also increases the swelling property of the ultra-microscopic particles which has the result of improving the cohesion and close film formation after the evaporation of the liquid phase dispersion medium.

To improve the adhesion of the compound and to suit particular application methods such as brushing, dipping or roller coating, plasticisers of the solvent-plasticiser type, such as chlorinated diphenyls or chlorinated paraffin or alkyl esters of abietic acid, are added to the compound. The plasticisers are best added to the polyethylene-polyisobutylene blend on a two roller compounding mill or in a Banbury type mixer, and at the same time the addition of microcrystalline mineral wax serves as a compounding aid to avoid the breakdown of the polymers by heat.

A typical composition for such a polyblend is as follows:

Example II

| | Parts by weight |
|---|---|
| Polyethylene | 54.0 |
| Polyisobutylene, molecular weight 95,000 | 23.0 |
| Chlorinated diphenyl, spec. gravity 1.620 | 15.3 |
| Microcrystalline mineral wax, melting point 55/60° C. | 7.7 |
| | 100.0 |

Such a polyblend may be compounded at a temperature of 120° to 130° C. in a two roller mill or in a Banbury mixer, and after cooling, the blend is reduced to chips.

A typical coating composition made from such a polyblend is as follows:

Example III

| | Parts by weight |
|---|---|
| Polyblend chips prepared as above | 30 |
| Xylol | 30 |
| Cyclohexanone | 18 |
| N-butyl alcohol | 22 |
| | 100 |

The above constituted coating composition may be prepared in a jacketed ball mill which is charged with the polyblend chips, an appropriate amount of grinding pebbles, and the solvent mixture of xylol and cyclohexanone. The charge is then heated to between 60° C. and 80° C. After dissolution of the chips the temperature is reduced to room temperature, and the butyl alcohol is added as a diluent, and the milling continued for about 72 hours.

The resulting dispersion contains approximately 30% solids and is particularly suitable for application by brushing.

A further coating composition which is prepared in a similar manner to that described in Example III is as follows:

Example IV

| | Parts by weight |
|---|---|
| Polyblend chips prepared as described in connection with Example II | 22 |
| Trichlorethylene | 20 |
| Toluol | 38 |
| Methylated spirit 94% denaturated with 2% toluol | 20 |
| | 100 |

The compositions described illustrate the wide range of compositions possible, and it will be understood that by substituting water for the non-solvents described as diluents, and with the aid of emulsifying agents, emulsions of the water in oil type are easily prepared. Thus the polyblend can be prepared from polyethylene, polyisobutylene and a mineral wax without the addition of a plasticiser. This polyblend is dissolved in its true solvents and an emulsified alkyl ester of abietic acid, such as methyl abietate, is added with water to the solution and ball milled until a colloidal dispersion of the emulsion type is achieved.

One use for which coating compositions in accordance with the invention find particular utility is the coating of crystalline substances. For example, piezo-electric crystal elements, especially those made from Rochelle salt, are effected by humidity, the atmosphere in which they are used, and in particular, the performance of such elements depends on the relative humidity to which they are exposed. The behaviour of these crystal elements is in fact such as to be expected of highly hygroscopic salts.

To make these piezo-electric elements stable within a wide range of humidity it has been found necessary to protect the crystals with a plastic coating of limited thickness which is impermeable to water vapour.

Further, piezo-electric crystals and especially Rochelle salt crystals, are also to a high degree heat sensitive. Temperatures in excess of 45° C. to 55° C., depending on the degree of humidity present, will cause the crystals to melt in their own water of crystallisation and with the water condensed from the atmosphere.

By the present invention it is possible to apply a polyethylene coating composition to such crystals without the application of heat.

The insulation resistance of Rochelle salt bimorph crystal elements dip coated with a composition prepared as described in Example IV to give a coating 0.004 inch thick, has been tested by exposing the elements to a temperature of 30° C. at a relative humidity of 96% over a period of 15 days. The crystal elements as shown in the attached table had an initial insulation resistance of over 12,000 megohms, and before testing they were left for 2 hours to adjust themselves to the test room conditions. After 15 days the elements were left for 12 hours at ambient conditions before testing. The insulation resistance measured each day was as follows:

| Crystal Element | Initial Insulation Resistance in Megohms | Insulation resistance in Megohms at day | | | | | | | | | | | | | | | After 12 hours' recovery |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | |
| 1 | Greater than— 12,000 | 2,850 | 980 | 620 | 340 | 245 | 200 | 185 | 170 | 165 | 175 | 155 | 120 | 155 | 125 | 125 | Greater than— 12,000 |
| 2 | 12,000 | 3,050 | 1,020 | 590 | 315 | 260 | 215 | 190 | 195 | 210 | 180 | 160 | 138 | 125 | 130 | 130 | 12,000 |
| 3 | 12,000 | 2,950 | 990 | 295 | 230 | 185 | 170 | 152 | 150 | 165 | 135 | 110 | 125 | 120 | 105 | 105 | 12,000 |
| 4 | 12,000 | 2,900 | 1,000 | 610 | 225 | 195 | 145 | 130 | 120 | 110 | 145 | 125 | 110 | 98 | 85 | 95 | 12,000 |

On the other hand Rochelle salt crystal elements coated with commercially available proofing compounds of undisclosed nature were subjected to the described humidity test; after the first day the insulation resistance dropped to under 5 megohms, and after 12 hours conditioning at ambient temperature failed to recover to even 30% of their initial resistances.

Similar tests carried out with piezo-electric mono- and micro-crystalline elements other than Rochelle crystal elements coated with coating compounds in accordance with the invention show high insulation resistances due to the low water vapour transmission and water absorption of the coating.

What I claim is:

1. The method of manufacture of a coating composition suitable for application without heat which comprises compounding polyethylene and polyisobutylene at a temperature of between 120° C. and 130° C., allowing the resultant compound to cool and solidify, breaking the cooled compound into chips, grinding the chips in a solvent in quantity sufficient to give a liquid composition containing not more than 30 percent of solids at a temperature of between 60° C. and 80° C. until the chips are dissolved, and continuing the grinding while reducing the temperature of the solution to room temperature until the mean size of the compound particles is less than 0.6 micron.

2. The method according to claim 1 in which the polyethylene and polyisobutylene are compounded in the presence of microcrystalline wax, said wax facilitating compounding without breakdown of the polymers.

3. The method according to claim 1 in which said solvent comprises an aromatic hydrocarbon.

4. The method according to claim 1 in which said solvent comprises a chlorinated hydrocarbon.

5. The method according to claim 1, in which said solvent comprises a ketone.

6. The method according to claim 1 in which said solvent is a mixture of cyclohexanone and xylol.

7. The method according to claim 1, in which said solvent is selected from the group consisting of aromatic hydrocarbons, chlorinated hydrocarbons and ketones.

8. The method according to claim 1, in which said solvent is a mixture of trichlorethylene and toluol.

9. The method according to claim 1 in which a diluent is added to the solution containing the dissolved chips after said solution has been reduced to room temperature.

10. The method according to claim 9, in which said diluent is an alcohol.

11. The method of manufacture of a coating composition suitable for application without heat which comprises compounding polyethylene and polyisobutylene at a temperature of at least 120° C., cooling the compounded blend, breaking the blend into fragments, grinding the fragments in a hydrocarbon solvent at a temperature of at least 60° C., the grinding being continued until the chips are dissolved, adding an alcoholic diluent and further grinding the mixture at ambient temperature until the means size of particles is less than 0.6 micron, the quantities of solvent and diluent used being sufficient to give a liquid composition containing not more than 30% of solids.

12. The method according to claim 11, in which said solvent is a mixture of toluol and trichlorethylene.

13. The method according to claim 11, in which said diluent is methylated spirit.

14. The method according to claim 11, in which said solvent is a mixture of xylol and cyclohexanone.

15. The method according to claim 11, in which said diluent is butyl alcohol.

16. The method according to claim 11, in which the polyisobutylene is present in a proportion of between 20 and 30% of the compound polymers.

17. The method according to claim 11, in which a solvent-plasticizer is added to the polymer mix during compounding.

18. The method according to claim 11, in which chlorinated diphenyl is added to the polymer mix during compounding.

19. The method according to claim 11, in which chlorinated paraffin is added to the polymer mix during compounding.

20. The method according to claim 11, in which an alkyl ester af abietic acid is added to the polymer mix during compounding.

21. The method according to claim 11, in which the polyisobutylene has a molecular weight of between 85,000 and 95,000.

22. The method of manufacture of a waterproof coating composition for formation of a waterproof coating on bodies without heat, which comprises compounding polyethylene and polyisobutylene at a temperature of between 120° C. and 130° C. in the presence of a solvent plasticizer and a microcrystalline mineral wax, the proportions of polyethylene to polyisobutylene being between 70 to 30 parts and 80 to 20 parts respectively, cooling the compounded blend, reducing the cooled blend to chips, heating the chips and a solvent to an elevated temperature of between 60° C. and 80° C., grinding the chips in the solvent at the elevated temperature until the chips are dissolved and reducing the temperature slowly to room temperature while continuing the grinding until the mean size of the compounded particles is less than 0.6 micron, the quantity of solvent being sufficient to give a liquid composition containing not more than 30 percent of solids.

23. The method of manufacture of a coating composition adapted for formation of waterproof coatings on bodies without the application of heat, which comprises compounding polyethylene and polyisobutylene at a temperature of between 120° C. and 130° C. in the presence of chlorinated diphenyl and microcrystalline mineral wax, cooling the blend, reducing the cooled blend to chips, heating the chips in a solvent mixture of toluol and trichlorethylene to a temperature of between 60° C. and 80° C., grinding the chips while slowly reducing the temperature of the solvent mixture to room temeparture, adding denatured methylated spirits and continuing the grinding until the mean size of the compounded particles is less than 0.6 micron, the quantities of solvent mixture and methylated spirits being sufficient to give a liquid composition containing not more than 30 percent of solids.

References Cited in the file of this patent

UNITED STATES PATENTS

| 2,384,848 | Peters | Sept. 18, 1945 |
| 2,456,995 | Robinson | Dec. 21, 1948 |

FOREIGN PATENTS

| 613,018 | Great Britain | Nov. 22, 1948 |

OTHER REFERENCES

"Annotated Comprehensive List of Trade Names of Synthetic," Research Association of British Rubber Manufacturers Information Bureau Circular No. 372, pages 12 and 113. Published October 1949.